United States Patent
Mori

(10) Patent No.: US 8,293,400 B2
(45) Date of Patent: Oct. 23, 2012

(54) BATTERY INCLUDING OPENING CLOSURE MEMBER WITH CASE CONTACT PART AND CASE INSIDE PART

(75) Inventor: Naomichi Mori, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 912 days.

(21) Appl. No.: 12/223,402

(22) PCT Filed: Sep. 21, 2007

(86) PCT No.: PCT/IB2007/002732
§ 371 (c)(1),
(2), (4) Date: Jul. 30, 2008

(87) PCT Pub. No.: WO2008/038086
PCT Pub. Date: Apr. 3, 2008

(65) Prior Publication Data
US 2009/0029243 A1 Jan. 29, 2009

(30) Foreign Application Priority Data
Sep. 26, 2006 (JP) ................................. 2006-259994

(51) Int. Cl.
*H01M 2/00* (2006.01)

(52) U.S. Cl. ........ 429/163; 429/175; 429/177; 429/176; 429/185

(58) Field of Classification Search .................. 429/163, 429/175, 176, 178, 185, 122, 177
See application file for complete search history.

(56) References Cited

U.S. PATENT DOCUMENTS

| 3,623,916 A | 11/1971 | Toyooka et al. |
| 2004/0180259 A1 | 9/2004 | Kim et al. |
| 2006/0207085 A1 | 9/2006 | Nakagawa et al. |
| 2010/0323238 A1 | 12/2010 | Takahashi et al. |

FOREIGN PATENT DOCUMENTS

EP 1 043 784 10/2000
(Continued)

OTHER PUBLICATIONS

International Search Report.
Written Opinion of the ISR.
(Continued)

*Primary Examiner* — Raymond Alejandro
(74) *Attorney, Agent, or Firm* — Finnegan, Henderson, Farabow, Garrett & Dunner, LLP

(57) ABSTRACT

A battery includes a power generation element, a case member that accommodates the power generation element, and an opening closure member that closes the case member. The opening closure member includes a case contact part for contacting an elongated opening edge of the case member around an entire periphery thereof, and a case inside part projecting toward an inside of the case member from a portion of a surface of the opening closure member on the case member side internally of the case contact part. The case inside part has two narrower portions positioned at both ends of the case inside part in a longitudinal direction of the elongated opening edge of the case member and spaced from an inner surface of the side of the case member, and a wider portion positioned between the two narrower portions and contacting an inner surface of the side of the case member.

5 Claims, 12 Drawing Sheets

FOREIGN PATENT DOCUMENTS

| | | |
|---|---|---|
| JP | 9-7557 | 1/1997 |
| JP | 10-202380 | 8/1998 |
| JP | 10-269999 | * 10/1998 |
| JP | 11-339737 | 12/1999 |

OTHER PUBLICATIONS

Notice of Allowance and Notice of Allowability for U.S. Appl. No. 13/294,593 dated Jul. 20, 2012.

* cited by examiner

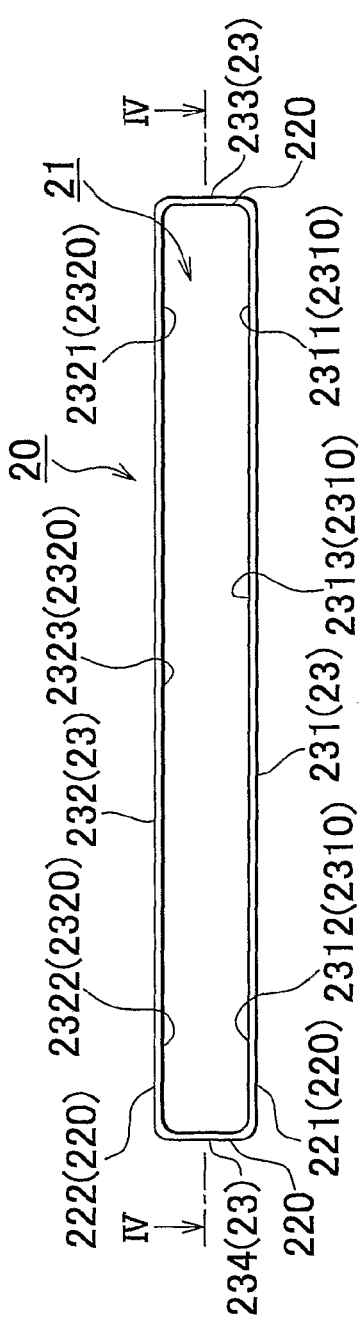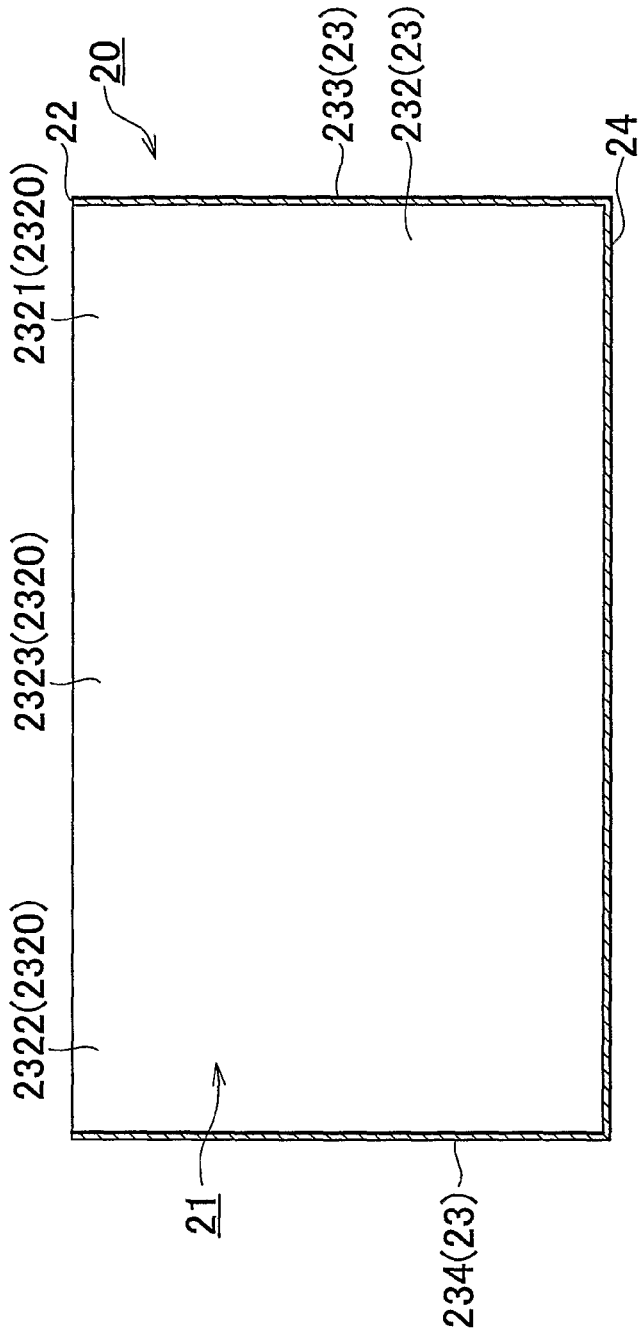

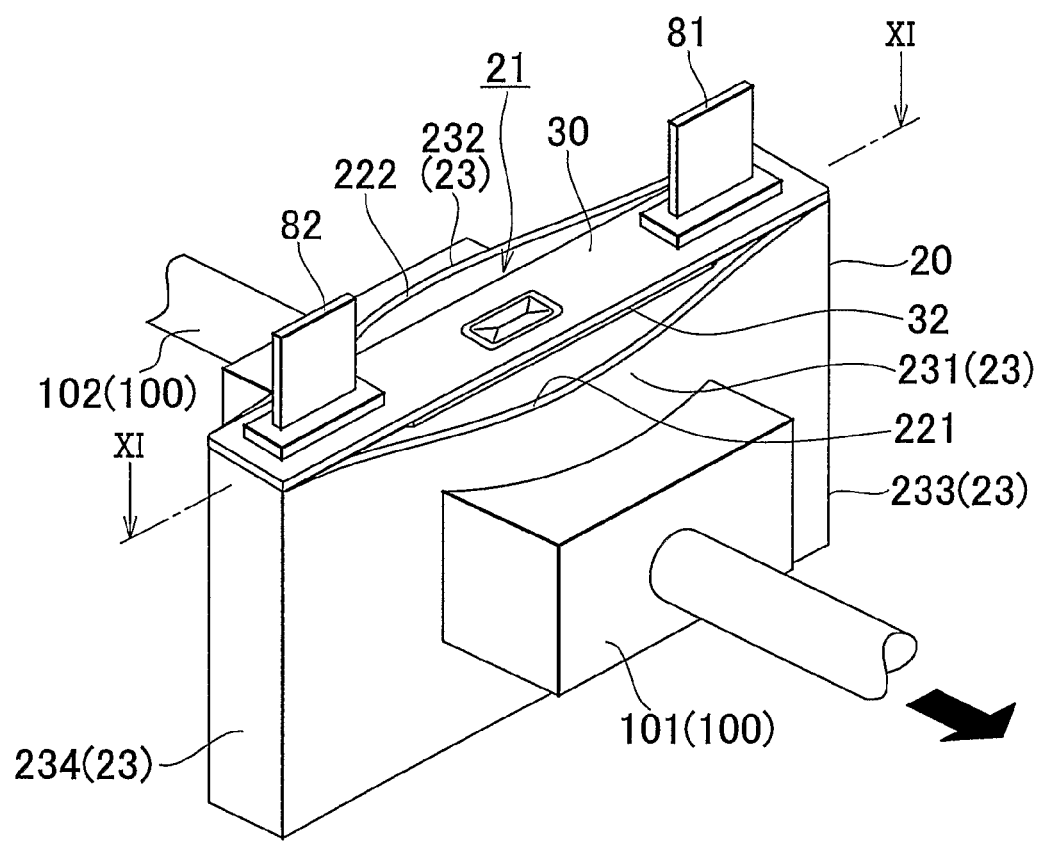
F I G . 10

BATTERY INCLUDING OPENING CLOSURE MEMBER WITH CASE CONTACT PART AND CASE INSIDE PART

BACKGROUND OF THE INVENTION

1. Field of the Invention

The present invention relates to a battery and a method for manufacturing a battery.

2. Description of the Related Art

In recent years, various types of batteries have been proposed as power sources for portable devices and cellular phones and also as power sources for electric and hybrid vehicles. For example, Japanese Patent Application Publication No. 10-269999 (JP-A-10-269999) describes an example of such batteries, which has a power generation element, a case member for accommodating the power generation element therein, and an opening closure member for closing an opening of the case member, and in which the case member and the opening closure member are welded to each other.

The battery described in JP-A-10-269999 has a box shape, and has a main body case (case member) which is a rectangular parallelepiped in external shape and which includes a bottom and four sides which form edges of the opening, and a lid member (opening closure member) which is rectangular in external shape. The lid member has thin edges around its periphery, and a projection projecting in the thickness direction at its center. The box-shaped battery is assembled by first installing a battery element (power generation element) inside the main body case, inserting the projection of the lid member into the main body case, and causing the thin edges of the lid member to contact the upper ends of the respective sides of the main body case to close the main body case. The main body case and the lid member are secured to each other by welding the thin edges of the lid member and the upper ends of the respective sides of the main body case from above the box-shaped battery.

In such batteries, the case member is closed by the opening closure member with a portion (case inside part) of the opening closure member positioned internally of the sides of the case member. However, if the outer dimensions of the case member and the opening closure member are varied, the case member and the opening closure member may rub against each other while inserting the case inside part of the opening closure member into a space internally of the sides of the case member. This may generate foreign matter such as metal powder. Thus, the outer dimensions of the case inside part are made small relative to the internal dimensions of the sides of the case member in consideration of the dimensional tolerances of the case member and the opening closure member, in order that the case inside part can be easily inserted into the case member. As a result, there is formed some gap between the sides and the case inside part in the case member.

The sides of the case member, especially the sides forming longer edges of the opening, are occasionally deformed toward the inside (warped inwardly) of the case member when it is molded. In the case where a gap is allowed between the sides and the case inside part as discussed above, however, such warping deformation of the sides of the case member causes the opening edges formed by the sides to be also warped inwardly. This causes the gap between the case inside part of the opening closure member and such warped sides to be inconstant as seen in the direction along the opening edges. In addition, in welding them to each other along the opening edges, the welding position is varied in the direction of the thickness of the sides. Thus, the sealing strength may be locally lowered. Meanwhile, the tolerances in outer dimensions of the case member and the opening closure member may be reduced. In such a case, however, the case inside part and the sides may rub against each other while positioning the case inside part inside the case member, which may generate foreign matter such as metal powder inside the case member and may cause deterioration in performance of the battery or short circuiting.

SUMMARY OF THE INVENTION

The present invention provides a battery in which a case member and an opening closure member are welded to each other appropriately around an entire periphery thereof, and a method for manufacturing a battery in which a case member and an opening closure member are welded to each other with an appropriate sealing strength without causing them to rub against each other before being welded.

A first aspect of the present invention is directed to a battery including: a power generation element; a case member that accommodates the power generation element in an accommodation recess of the case member and has a bottom and a side forming an opening edge of the accommodation recess; an opening closure member that closes the accommodation recess of the case member and has around an entire periphery thereof an annular case contact part for contacting the opening edge of the case member from an outer side, and a case inside part positioned internally of the case contact part in an extending direction of the opening closure member and projecting toward the accommodation recess of the case member relative to the case contact part; and a welded part formed by welding the side of the case member and the case contact part of the opening closure member around an entire periphery of the side and the case contact part. The opening edge includes a first longest straight edge that is longest in length, and a second longest straight edge that is as long as and in parallel to the first longest straight edge. The side includes a first side forming the first longest straight edge and a second side forming the second longest straight edge. The first side has a first edge along the first longest straight edge. The first edge has a first-first end and a first-second end positioned at both ends of the first edge in a direction along the first longest straight edge, and a first center edge positioned between the first-first end and the first-second end. The second side has a second edge along the second longest straight edge. The second edge has a second-first end and a second-second end positioned at both ends of the second edge in a direction along the second longest straight edge, and a second center edge positioned between the second-first end and the second-second end. The case inside part of the opening closure member contacts the first center edge of the first edge to prevent warping deformation of the first edge toward the accommodation recess, and is spaced from the first-first end and the first-second end. The case inside part of the opening closure member further contacts the second center edge of the second edge to prevent warping deformation of the second edge toward the accommodation recess, and is spaced from the second-first end and the second-second end.

In the battery in accordance with the first aspect of the present invention, the first and second longest straight edges are the longest in length of the straight edges forming the opening edge of the case member, and thus a portion of the first and second longest straight edges that is between one and the other ends in the longitudinal direction tends to be deformed or warped. According to the first aspect of the present invention, however, the case inside part contacts the first center edge to prevent the first edge from being deformed toward the accommodation recess (inwardly warped). This prevents the sealing strength from being locally lowered due to inward deformation or warping of the first side while welding the first edge of the first side and the case contact part of the opening closure member to each other. The case inside part also contacts the second center edge to prevent the second edge from being deformed toward the accommodation recess (inwardly warped). This prevents the sealing strength from being locally lowered due to inward deformation or warping of the second side while welding the second edge of the second side and the case contact part of the opening closure member to each other. On the other hand, the case inside part is spaced from the first-first end and the first-second end. The case inside part is also spaced from the second-first end and the second-second end. Accordingly, the case inside part and the first-first end and so on of the case member are prevented from rubbing against each other to generate metal powder while disposing the case inside part internally of the case member.

The first and second center edges of the first and second sides can be elastically deformed easily. Accordingly, it is possible to prevent the case inside part and the case member from rubbing against each other, and hence to avoid the generation of metal powder, by inserting the case inside part into the case member while elastically deforming the first and second central edges to swell outwardly.

The opening closure member has such a shape that its case inside part and the side of the case member satisfy the relation discussed above. For example, the opening closure member may be shaped such that the case inside part contacts the first and second center edges over their entirety. Alternatively, the first and second center edges may be contacted by the case inside part only partly (at one or a plurality of points) as long as the first and second edges can be prevented from being deformed or warped toward the accommodation recess. The welding method may be laser welding, electron beam welding or the like. The direction of applying a beam during welding, in other words, the direction of the welding depth, may be the thickness direction of the side of the case member.

In the battery discussed above, the case inside part of the opening closure member may have a first inside part side surface facing the first center edge and a second inside part side surface facing the second center edge, the entire first center edge may contact the first inside part side surface in the direction along the first longest straight edge, and the entire second center edge may contact the second inside part side surface in the direction along the second longest straight edge.

That is, the first and second center edges contact the first and second inside part side surfaces entirely in the direction along the first and second longest straight edges, respectively. This makes changes in welding position at the first and second center edges difficult while welding the first and second sides and the case contact part of the opening closure member to each other, thereby allowing more appropriate welding and providing a more stable sealing strength at the first and second center edges.

In the battery discussed above, a welding depth of a first center welded part, which includes the welded part where the first center edge is welded, in a thickness direction of the first side may be greater than the welding depth of a first-first end welded part, which includes the welded part where the first-first end is welded, and the welding depth of a first-second end welded part, which includes the welded part where the first-second end is welded. A welding depth of a second center welded part, which includes the welded part where the second center edge is welded, in a thickness direction of the second side may also be greater than the welding depth of a second-first end welded part, which include the welded part where the second-first end is welded, and the welding depth of a second-second end welded part, which includes the welded part where the second-second end is welded.

While charging the battery, for example, an increase in internal pressure of the battery may cause the first and second sides of the case member to swell outwardly, so that there may be a stress in the direction of drawing the first and second edges and the case contact part of the opening closure member apart from each other. In this case, the first center welded part between the first center edge and the case contact part and the second center welded part between the second center edge and the case contact part, in particular, are subjected to the largest stress. However, the first center welding depth is greater than the welding depth of the first-first end welded part and the welding depth of the first-second end welded part. Also, the second center welding depth is greater than the welding depth of the second-first end welded part and the welding depth of the second-second end welded part. Accordingly, the sealing strength of the first center welded part is greater than those of the first-first end welded part and the first-second end welded part. Likewise, the sealing strength of the second center welded part is greater than those of the second-first end welded part and the second-second end welded part. Consequently, it is possible to prevent breakage of the battery due to breakage of the welded part between the first side or the second side of the case member and the case contact part of the opening closure member. Since the first and second center edges are in contact with the first and second inside part side surfaces, respectively, welding sparks do not fall into the case member even if the first and second center welding depths are increased.

A second aspect of the present invention is directed to a method for manufacturing a battery. The battery includes a power generation element; a case member that accommodates the power generation element in an accommodation recess of the case member and has a bottom and a side forming an opening edge of the accommodation recess; and an opening closure member that closes the accommodation recess of the case member and has around an entire periphery thereof an annular case contact part for contacting the opening edge of the case member from an outer side, and a case inside part positioned internally of the case contact part in an extending direction of the opening closure member and projecting toward the accommodation recess of the case member relative to the case contact part. The opening edge includes a first longest straight edge that is longest in length, and a second longest straight edge that is as long as and in parallel to the first longest straight edge. The side includes a first side forming the first longest straight edge and a second side forming the second longest straight edge. The side of the case member and the case contact part of the opening closure member are welded to each other around an entire periphery of the side and the cast contact part. In the method for manufacturing the battery, the case inside part of the opening closure member is positioned between the first side and the second side. The first side is disposed such that a first center edge of a first edge of the first side contacts the case inside part to prevent warping deformation of the first edge toward the accommodation recess and such that a first-first end and a first-second end of the first edge and the case inside part are spaced from each other. Here, the first edge is a portion of the first side that is along the first longest straight edge, the first-first end and the first-second end are both ends of the first edge in a direction along the first longest straight edge, and the first center edge is a portion between the first-first end and the first-second end. In addition, the second side is disposed such that a second center edge of a second edge of the second side contacts the case inside part to prevent warping deformation of the second edge toward the accommodation recess and such that a second-first end and a second-second end of the second edge and the case inside part are spaced from each other. Here, the second edge is a portion of the second side that is along the second longest straight edge, the second-first end and the second-second end are both ends of the second edge in a direction along the second longest straight edge, and the second center edge is a portion between the second-first end and the second-second end.

According to the method for manufacturing a battery in accordance with the second aspect of the present invention, in the opening closure member disposing step, the case inside part of the opening closure member is caused to contact the first and second center edges to reform the first and second edges into a shape without warping deformation toward the accommodation recess. Accordingly, even if the case member with its first and second sides inwardly warped in the free state is used, such inward warping can be corrected to allow appropriate welding, thereby preventing the sealing strength from being lowered by such inward warping. On the other hand, the case inside part is disposed apart from the first-first end and the first-second end. The case inside part is also disposed apart from the second-first end and the second-second end. Accordingly, the case inside part and the first-first end and so on are prevented from rubbing against each other to generate metal powder while disposing the case inside part internally of the case member.

In the method for manufacturing a battery discussed above, the first side may be pressed toward the accommodation recess to bring the case inside part of the opening closure member into press contact with the first center edge of the first edge of the first side, and the first edge of the first side and the case contact part of the opening closure member may be welded over the entire first edge. Further, the second side may be pressed toward the accommodation recess to bring the case inside part of the opening closure member into press contact with the second center edge of the second edge of the second side, and the second edge of the second side and the case contact part of the opening closure member may be welded over the entire second edge.

The first side and the second side of the case member are possibly deformed to swell outwardly (warped outwardly) in the free state. In the above method for manufacturing a battery, however, the first side is pressed toward the accommodation recess to bring the case inside part of the opening closure member into press contact with the first center edge of the first edge of the first side before welding. In addition, the second side is pressed toward the accommodation recess to bring the case inside part of the opening closure member into press contact with the second center edge of the second edge of the second side before welding. As a result, even if the case member with outward warping is used, such outward warping is corrected to reform the first and second sides before welding, thereby preventing the sealing strength from being lowered by changes in welding position due to such outward warping.

It is possible to fix the position of the case inside part, and hence the opening closure member, by being contacted by the first and second edges, by pressing the first and second sides toward the accommodation recess to bring the case inside part into press contact with the first and second center edges as described above. Accordingly, a temporarily fixing step to temporarily fix the opening closure member to the case member by spot welding or the like, which is normally performed prior to the welding step in which they are welded to each other around their entire periphery, can be omitted. That is, the sides of the case member and the case contact part of the opening closure member can be welded to each other around their entire periphery in the welding step without temporarily fixing the opening closure member to the case member in advance.

The case inside part may be positioned between the first side and the second side after elastically deforming the first side and the second side outwardly to deform the first longest straight edge and the second longest straight edge, respectively, into an outwardly convex shape.

That is, the first and second sides are elastically deformed to deform the first and second longest straight edges, respectively, into an outwardly convex shape, and then the case inside part is positioned between the first side and the second side, i.e., internally of the sides of the case member, in other words, the case inside part is inserted into the accommodation recess. In this way, it is possible to prevent the case inside part from rubbing against the first and second center edges while inserting the case inside part, and hence to reliably prevent the generation of metal powder.

A third aspect of the present invention is directed to a battery including: a power generation element; a case member that accommodates the power generation element, the case member having a bottom, a side and an elongated opening edge; and an opening closure member that closes the case member. The opening closure member has a case contact part for contacting the opening edge around an entire periphery thereof, and a case inside part projecting toward an inside of the case member from a portion of a surface of the opening closure member on the case member side internally of the case contact part. The case inside part has two narrower portions positioned at both ends of the case inside part in a longitudinal direction of the opening edge of the case member and spaced from an inner surface of the side of the case member, and a wider portion positioned between the two narrower portions and contacting an inner surface of the side of the case member. This prevents the case member from being warped inwardly with respect to the longitudinal direction of the elongated opening edge, and prevents the generation of metal powder due to rubbing between the case member and the narrower portions of the case inside part, for example.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4A is a plan view showing a case member of the battery in accordance with the embodiment;

FIG. 4B is a cross sectional view taken along the line IV-IV in FIG. 4A;

FIG. 10 is a view illustrating the opening closure member disposing step of the method for manufacturing a battery in accordance with the embodiment, showing the state immediately after the case inside part of the opening closure member is positioned between the first and second sides of the case member;

DETAILED DESCRIPTION OF EMBODIMENTS

An embodiment of the present invention will be described below with reference to the drawings.

Figure 1:
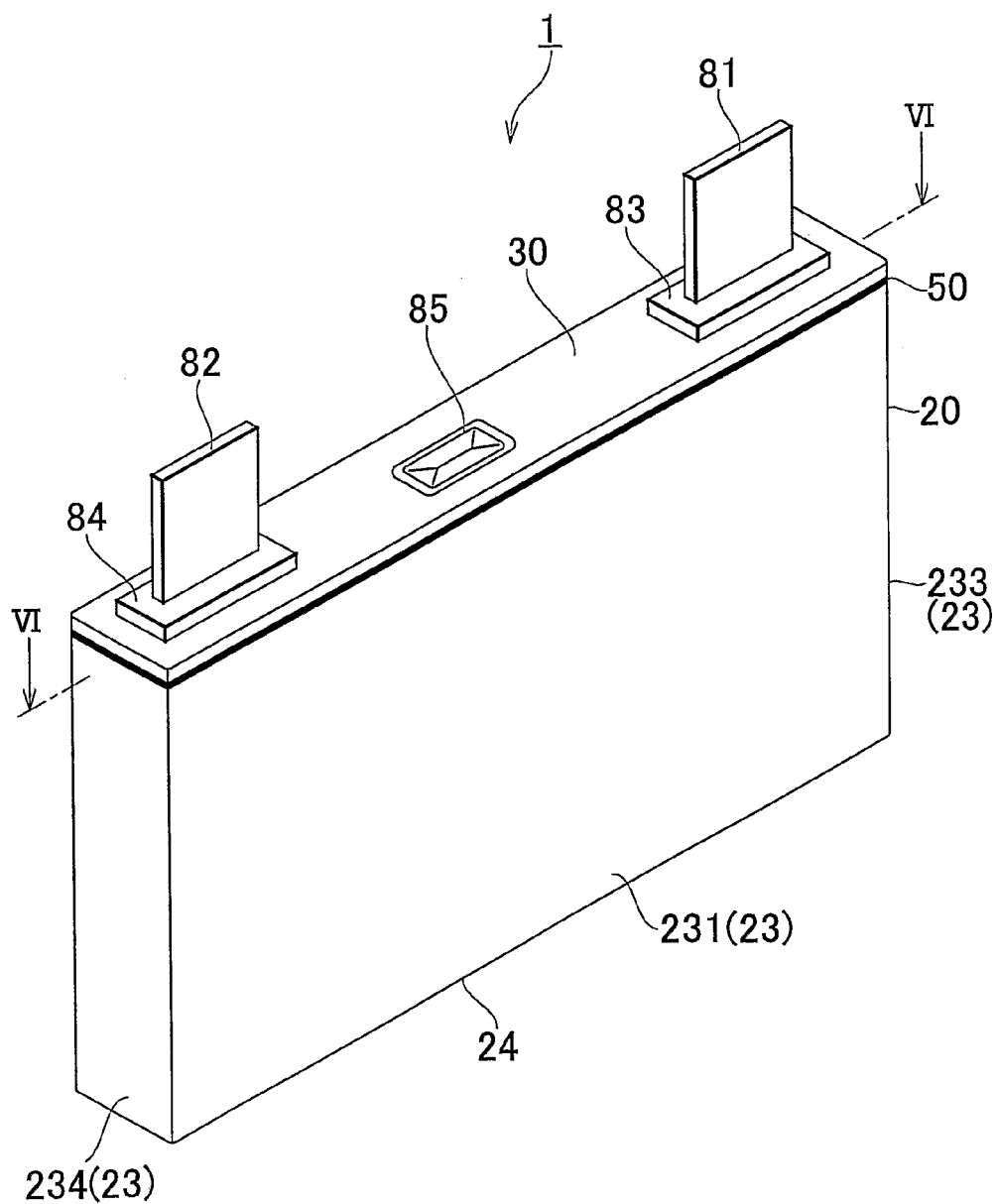
FIG. 1 is a perspective view showing a battery in accordance with an embodiment.
Figure 2:
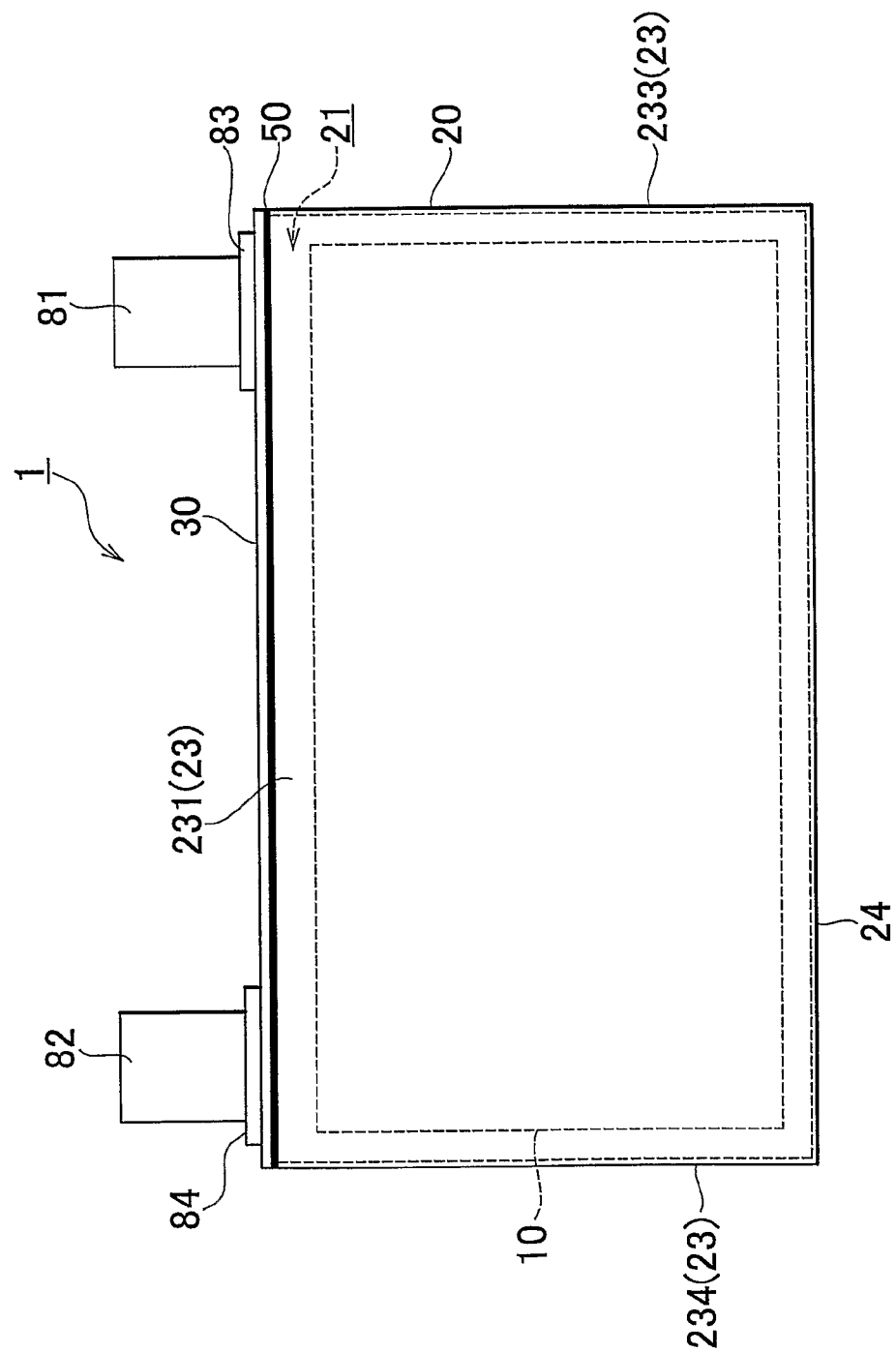
FIG. 2 is a front view of the battery in accordance with the embodiment.
Figure 3:
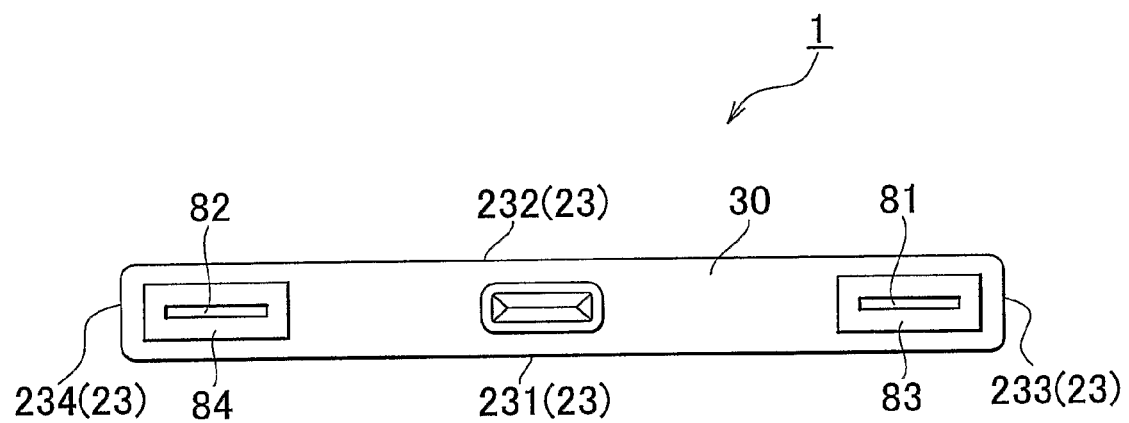
FIG. 3 is a plan view of the battery in accordance with the embodiment.

A battery 1 in accordance with this embodiment is a secondary battery such as a nickel hydrogen battery and a lithium ion battery for use as driving sources for electric vehicles and hybrid vehicles. As shown in FIGS. 1 to 3, the battery 1 is a box-shaped electric cell generally having the shape of a rectangular parallelepiped. The battery 1 is made up of a power generation element 10, a case member 20 generally in the shape of a rectangular parallelepiped and having an accommodation recess 21 for accommodating the power generation element 10, and an opening closure member 30 for closing the accommodation recess 21 and generally in the shape of a rectangular plate. The case member 20 and the opening closure member 30 are secured to each other by laser welding at a welded part 50 around their entire periphery (see FIG. 1).

The case member 20 has the shape of a box which is open on the insertion side (on the upper side in FIGS. 1, 2 and 4B), and is integrally formed by deep drawing an aluminum material. The case member 20 has a bottom 24 generally having the shape of a rectangular plate, and four sides 23 extending from the four edges of the bottom 24. Of the sides 23, one of the largest sides is referred to as a first side 231, and the other one of the largest sides that is in parallel to the first side 231 is referred to as a second side 232. The sides that are disposed between the first side 231 and the second side 232 and that are parallel to each other are referred to as a third side 233 and a fourth side 234. The case member 20 has an opening edge 22 which forms the edge of an opening of the accommodation recess 21 discussed above. The opening edge 22 is generally in the shape of an elongated rectangle that is rounded at four corners. The opening edge 22 includes four straight edges 220. The straight edges 220 includes a first longest straight edge 221 that is formed by the first side 231, and a second longest straight edge 222 that is formed by the second side 232 and that is as long as and in parallel to the first longest straight edge 221.

As shown in FIGS. 4A and 4B, a portion of the first side 231 that is along the first longest straight edge 221 is referred to as a first edge 2310. Both ends of the first edge 2310 in the direction along the first longest straight edge 221, or in the longitudinal direction of the opening edge (in the horizontal direction in FIGS. 4A and 4B), are referred to as a first-first end 2311 and a first-second end 2312. A portion of the first edge 2310 that is between the first-first end 2311 and the first-second end 2312 is referred to as a first center edge 2313. Likewise, as shown in FIGS. 4A and 4B, a portion of the second side 232 that is along the second longest straight edge 222 is referred to as a second edge 2320. Both ends of the second edge 2320 in the direction along the second longest straight edge 222 (in the horizontal direction in FIGS. 4A and 4B) are referred to as a second-first end 2321 and a second-second end 2322. A portion of the second edge 2320 that is between the second-first end 2321 and the second-second end 2322 is referred to as a second center edge 2323.

Figure 5A:
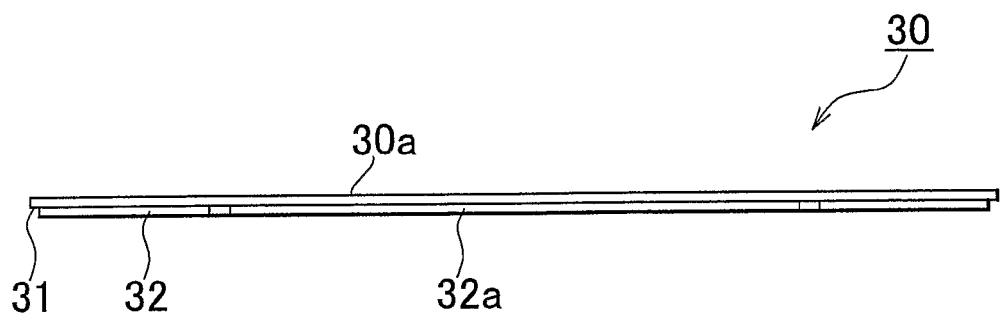
FIG. 5A is a side view showing an opening closure member of the battery in accordance with the embodiment.
Figure 5B:
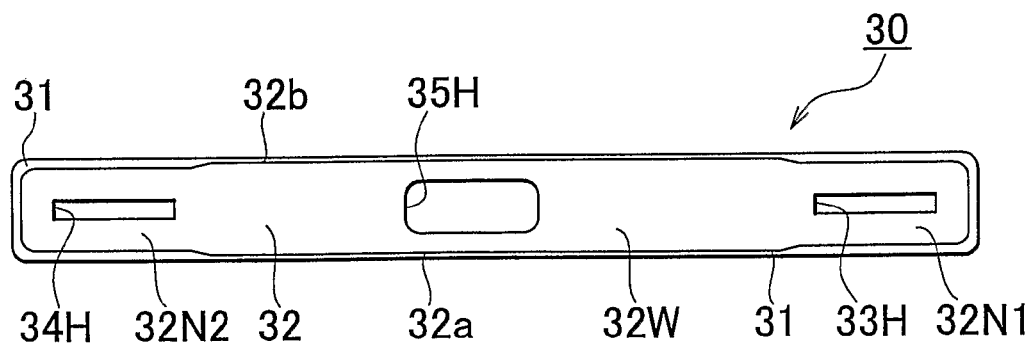
FIG. 5B is a plan view of the opening closure member as seen from the side of a case inside part.

The opening closure member 30 is in the shape of a rectangular plate having a projection in the thickness direction as shown in FIGS. 5A and 5B, and is formed by pressing an aluminum material. The opening closure member 30 has a cyclic (an annular) case contact part 31 for contacting the opening edge 22 of the case member 20 around its entire periphery when the opening closure member 30 closes the accommodation recess 21 of the case member 20. The opening closure member 30 also has a case inside part 32 positioned internally of the case contact part 31 in the extending direction of the opening closure member 30 (in the direction parallel to the drawing sheet of FIG. 5B) and projecting from the case contact part 31 toward the inside of the accommodation recess 21 of the case member 20 so as to be disposed internally of the sides 23 of the case member 20.

As shown in FIG. 5B, the case inside part 32 has a wider portion 32W that is relatively wide in its width direction (in the vertical direction in FIG. 5B) as seen in plan, and narrower portions 32N1 and 32N2 that are disposed on both sides of the wider portion 32W in the longitudinal direction of the opening edge 22 (or the opening closure member 30) and that are narrower than the wider portion 32W. One side surface of the wider portion 32W faces the first center edge 2313 of the first edge 2310 when the opening closure member 30 closes the accommodation recess 21 of the case member 20, and is referred to as a first inside part side surface 32a. The other side surface of the wider portion 32W, which is opposite to the first inside part side surface 32a, faces the second center edge 2323 of the second edge 2320, and is referred to as a second inside part side surface 32b.

As shown in FIGS. 1, 2, 5A and 5B, the opening closure member 30 has a positive terminal insertion hole 33H and a negative terminal insertion hole 34H for allowing insertion of an external positive terminal 81 and an external negative terminal 82 to be discussed later, respectively, and a valve hole 35H positioned therebetween and penetrating through the opening closure member 30. The valve hole 35H is closed by a plate-like safety valve 85.

The power generation element 10 is made up of, for example, a positive electrode, a negative electrode, a separator, an electrolyte solution and so on, and accommodated in the accommodation recess 21 of the case member 20 as shown in FIG. 2. The positive electrode (not shown) of the power generation element 10 is connected to the external positive terminal 81 in the accommodation recess 21. On the other hand, the negative electrode (not shown) of the power generation element 10 is connected to the external negative terminal 82 in the accommodation recess 21. The electrolyte solution (not shown) is poured into the accommodation recess 21.

The external positive terminal 81 connected to the positive electrode of the power generation element 10 is made of aluminum. The external positive terminal 81 projects outwardly through the positive terminal insertion hole 33H of the opening closure member 30 with a positive terminal seal member 83 sealing the accommodation recess 21 liquid-tightly and insulating the external positive terminal 81 from the opening closure member 30. The positive terminal seal member 83 is molded around the positive terminal insertion hole 33H (see FIGS. 5A and 5B). On the other hand, the external negative terminal 82 connected to the negative electrode of the power generation element 10 is made of copper. The external negative terminal 82 projects outwardly through the negative terminal insertion hole 34H of the opening closure member 30 with a negative terminal seal member 84 sealing the accommodation recess 21 liquid-tightly and insulating the external negative terminal 82 from the opening closure member 30. The negative terminal seal member 84 is molded around the negative terminal insertion hole 34H (see FIGS. 5A and 5B).

In the battery 1 in accordance with this embodiment, the opening closure member 30 closes the case member 20 with the power generation element 10 accommodated in the accommodation recess 21, and is air-tightly secured to the case member 20 with the case inside part 32 positioned in the accommodation recess 21, in other words, internally of the sides 23 of the case member 20. Specifically, the case member 20 and the opening closure member 30 are welded to each other by causing the case contact part 31 of the opening closure member 30 to contact the opening edge 22 formed by the sides 23 of the case member 20, and laser welding them around their entire periphery to form the welded part 50 (see FIGS. 7A, 7B, 8A and 8B).

Figure 7A:
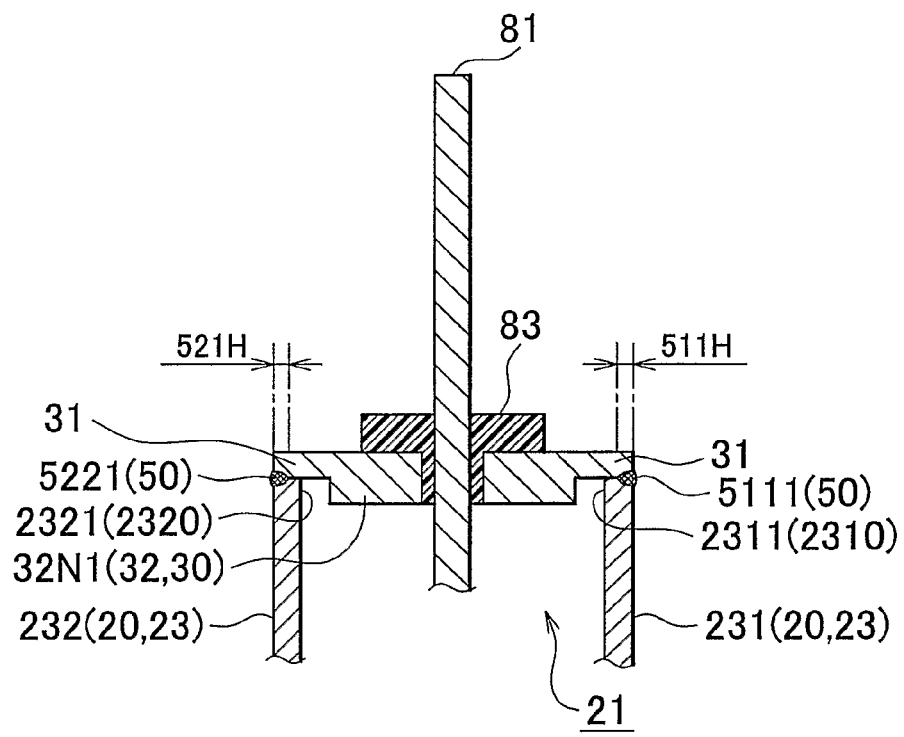
FIG. 7A is a cross sectional view taken along the line VIIa-VIIa of FIG. 6.
Figure 7B:
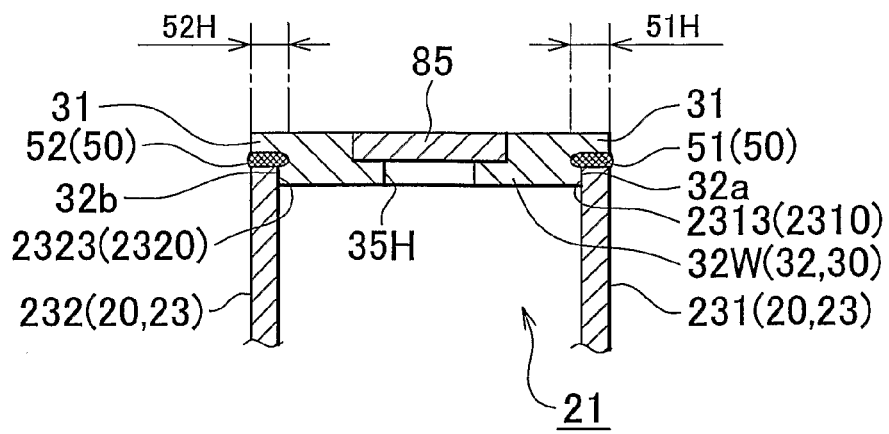
FIG. 7B is a cross sectional view taken along the line VIIb-VIIb of FIG. 6.

A more specific description follows. FIGS. 7A to 8B are explanatory views illustrating how the case member and the opening closure member are welded to each other in the battery in accordance with the embodiment. As shown in FIG. 7B, the first center edge 2313 of the first edge 2310 of the first side 231 of the case member 20 contacts the first inside part side surface 32a of the wider portion 32W of the case inside part 32 of the opening closure member 30. This allows the first center edge 2313 and the case contact part 31 to be secured to each other at a first center welded part 51 of the welded part 50, while preventing the first side 231 from being deformed toward the accommodation recess 21 (inwardly warped) even if the first side 231 of the case member 20 is inwardly deformed or warped in the free state. The first center welding depth 51H of the first center welded part 51 in the thickness direction of the first side 231 (in the horizontal direction in FIG. 7B) exceeds the thickness of the first side 231 so that the first center welded part 51 reaches the case inside part 32. In addition, the narrower portions 32N1 and 32N2 of the case inside part 32 and the first-first end 2311 and the first-second end 2312 of the first edge 2310, respectively, are spaced from each other (see FIGS. 7A and 8A). Further, the case contact part 31 is secured to the first-first end 2311 and the first-second end 2312 at a first-first end welded part 5111 and a first-second end welded part 5112 of the welded part 50, respectively. As can be understood by comparing FIG. 7B with FIGS. 7A and 8A, the first center welding depth 51H of the first center welded part 51 in the thickness direction of the first side 231 is greater than the first-first end welding depth 511H of the first-first end welded part 5111 and the first-second end welding depth 512H of the first-second end welded part 5112 in the same direction.

Likewise, as shown in FIG. 7B, the second center edge 2323 of the second edge 2320 of the second side 232 of the case member 20 contacts the second inside part side surface 32b of the wider portion 32W of the case inside part 32 of the opening closure member 30. This allows the second center edge 2323 and the case contact part 31 to be secured to each other at a second center welded part 52 of the welded part 50, while preventing the second side 232 from being deformed toward the accommodation recess 21 (inwardly warped). The second center welding depth 52H of the second center welded part 52 in the thickness direction of the second side 232 (in the horizontal direction in FIG. 7B) exceeds the thickness of the second side 232 so that the second center welded part 52 reaches the case inside part 32. In addition, the narrower portions 32N1 and 32N2 of the case inside part 32 and the second-first end 2321 and the second-second end 2322 of the second edge 2320, respectively, are spaced from each other (see FIGS. 7A and 8A). Further, the case contact part 31 is secured to the second-first end 2321 and the second-second end 2322 at a second-first end welded part 5221 and a second-second end welded part 5222 of the welded part 50, respectively. The second center welding depth 52H of the second center welded part 52 in the thickness direction of the second side 232 is greater than the second-first end welding depth 521H of the second-first end welded part 5221 and the second-second end welding depth 522H of the second-second end welded part 5222 in the same direction.

Figure 6:
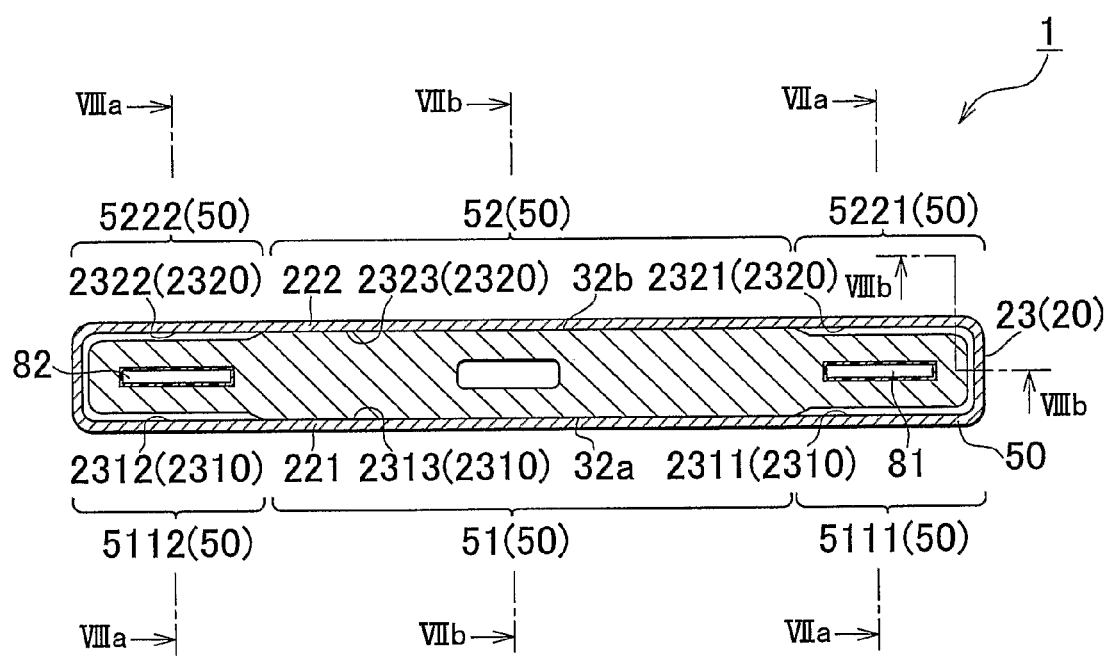
FIG. 6 is a cross sectional view taken along the line VI-VI of FIG. 1.
Figure 8A:
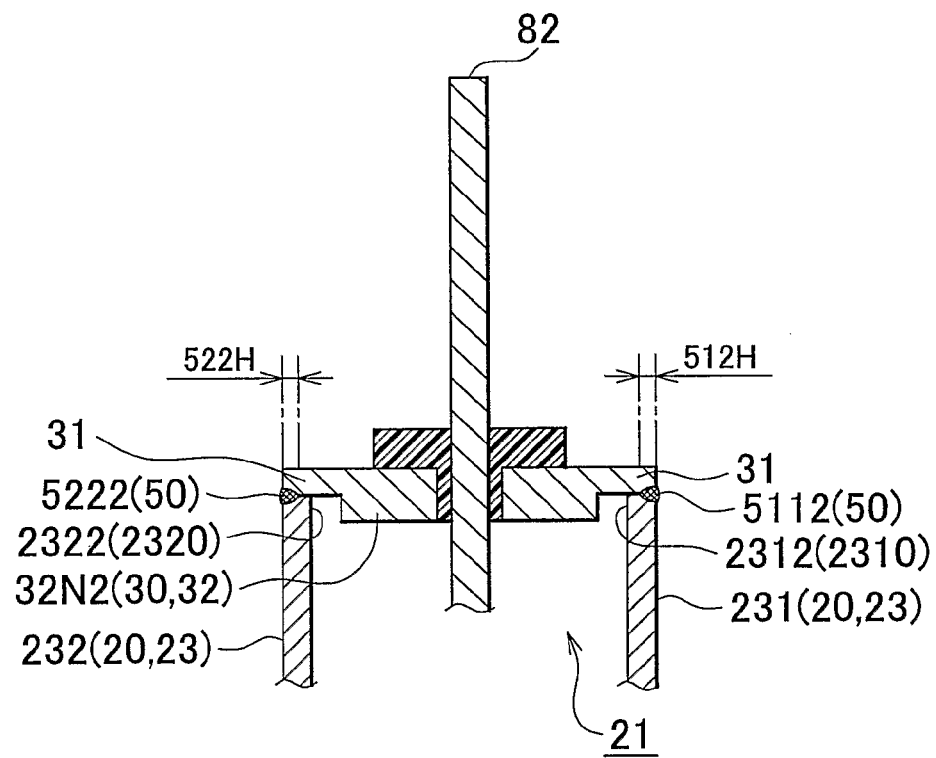
FIG. 8A is a cross sectional view taken along the line VIIIa-VIIIa of FIG. 6.
Figure 8B:
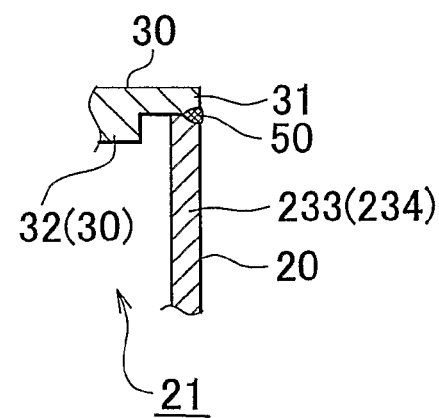
FIG. 8B is a cross sectional view taken along the line VIIIb-VIIIb of FIG. 6.

Moreover, as shown in FIGS. 6 and 8B, the case contact part 31 is secured to each of the third side 233 and the fourth side 234 at the welded part 50 with the case inside part 32 spaced from each of the third side 233 and the fourth side 234. The case member 20 and the opening closure member 30 are welded to each other at the welded part 50 around their entire periphery between the sides 23 of the case member 20 and the case contact part 31 of the opening closure member 30 as described above.

In the case member 20 of the battery 1 in accordance with this embodiment, the first and second longest straight edges 221 and 222 are the longest of the four straight edges 220. For this reason, a portion of the first and second longest straight edges 221 and 222 that is between their both ends in the longitudinal direction (in the horizontal direction in FIGS. 4A and 4B) tends to be deformed or warped. Therefore, the first center edge 2313 contacts the wider portion 32W of the case inside part 32 of the opening closure member 30 to prevent the first edge 2310 from being deformed toward the accommodation recess 21 (inwardly warped). This prevents changes in welding position, and hence prevents the sealing strength from being locally lowered, due to inward deformation or warping of the first side 231 while welding the first edge 2310 of the first side 231 and the case contact part 31 of the opening closure member 30 to each other. In addition, the second center edge 2323 contacts the wider portion 32W of the case inside part 32 to prevent the second edge 2320 from being deformed toward the accommodation recess 21 (inwardly warped). This prevents changes in welding position, and hence prevents the sealing strength from being locally lowered, due to inward deformation or warping of the second side 232 while welding the second edge 2320 of the second side 232 and the case contact part 31 of the opening closure member 30 to each other.

On the other hand, the narrower portions 32N1 and 32N2 of the case inside part 32 are spaced from the first-first end 2311 and the first-second end 2312, and also spaced from the second-first end 2321 and the second-second end 2322. Accordingly, the case inside part 32 and the sides 23 of the case member 20 are prevented from rubbing against each other to generate metal powder while disposing the case inside part 32 internally of the sides 23 of the case member 20. The first and second sides 231 and 232 can be elastically deformed easily. Thus, it is possible to prevent the case inside part 32 and the case member 20 from rubbing against each other, and hence to avoid the generation of metal powder, by inserting the case inside part 32 into the accommodation recess 21 of the case member 20 while elastically deforming the first and second central edges 2313 and 2323 to swell outwardly as discussed later.

As shown in FIG. 6, in the battery 1 in accordance with this embodiment, the first and second center edges 2313 and 2323 are in tight contact with the first and second inside part side surfaces 32a and 32b of the case inside part 32 over their entirety in the direction along the first and second longest straight edges 221 and 222 (in the horizontal direction in FIG. 6), respectively. This makes changes in welding position at the first and second center edges 2313 and 2323 difficult while welding the first and second sides 231 and 232 and the case contact part 31 of the opening closure member 30 to each other, thereby allowing more appropriate welding and providing a more stable sealing strength at the first and second center edges 2313 and 2323.

While charging the battery 1, for example, an increase in internal pressure of the battery 1 may cause the first and second sides 231 and 232 of the case member 20 to swell outwardly, so that the first and second sides 231 and 232 may be subjected to a stress in the direction of drawing the first and second sides 231 and 232 and the case contact part 31 of the opening closure member 30 apart from each other. In this case, the first center welded part 51 between the first center edge 2313 and the case contact part 31 and the second center welded part 52 between the second center edge 2323 and the case contact part 31, in particular, are subjected to the largest stress. In the battery 1, however, the first center welding depth 51H of the first center welded part 51 is greater than the first-first end welding depth 511H of the first-first end welded part 5111 and the first-second end welding depth 512H of the first-second end welded part 5112. In addition, the second center welding depth 52H of the second center welded part 52 is greater than the second-first end welding depth 521H of the second-first end welded part 5221 and the second-second end welding depth 522H of the second-second end welded part 5222.

Accordingly, the sealing strength of the first center welded part 51 can be made larger than those of the first-first end welded part 5111 and the first-second end welded part 5112. Likewise, the sealing strength of the second center welded part 52 can be made larger than those of the second-first end welded part 5221 and the second-second end welded part 5222. Consequently, it is possible to prevent breakage of the welded part 50 between the first side 231 or the second side 232 of the case member 20 and the case contact part 31 of the opening closure member 30, that is, breakage of the battery 1.

Now, a method for manufacturing the battery 1 is described with reference to FIGS. 9 to 12. The steps other than the opening closure member disposing step and the welding step to be discussed in detail later may be performed in a known manner, and will not be described or will only be briefly described.

First, the external positive terminal 81 and the external negative terminal 82 are connected to the positive electrode and the negative electrode, respectively, of the power generation element 10 in a known manner. Then, the external positive terminal 81 and the external negative terminal 82 are inserted through the positive terminal insertion hole 33H and the negative terminal insertion hole 34H, respectively, of the opening closure member 30. Then, the space between the external positive terminal 81 and the positive terminal insertion hole 33H and the space between the external negative terminal 82 and the negative terminal insertion hole 34H are air-tightly sealed by the positive terminal seal member 83 and the negative terminal seal member 84, respectively.

Figure 9:
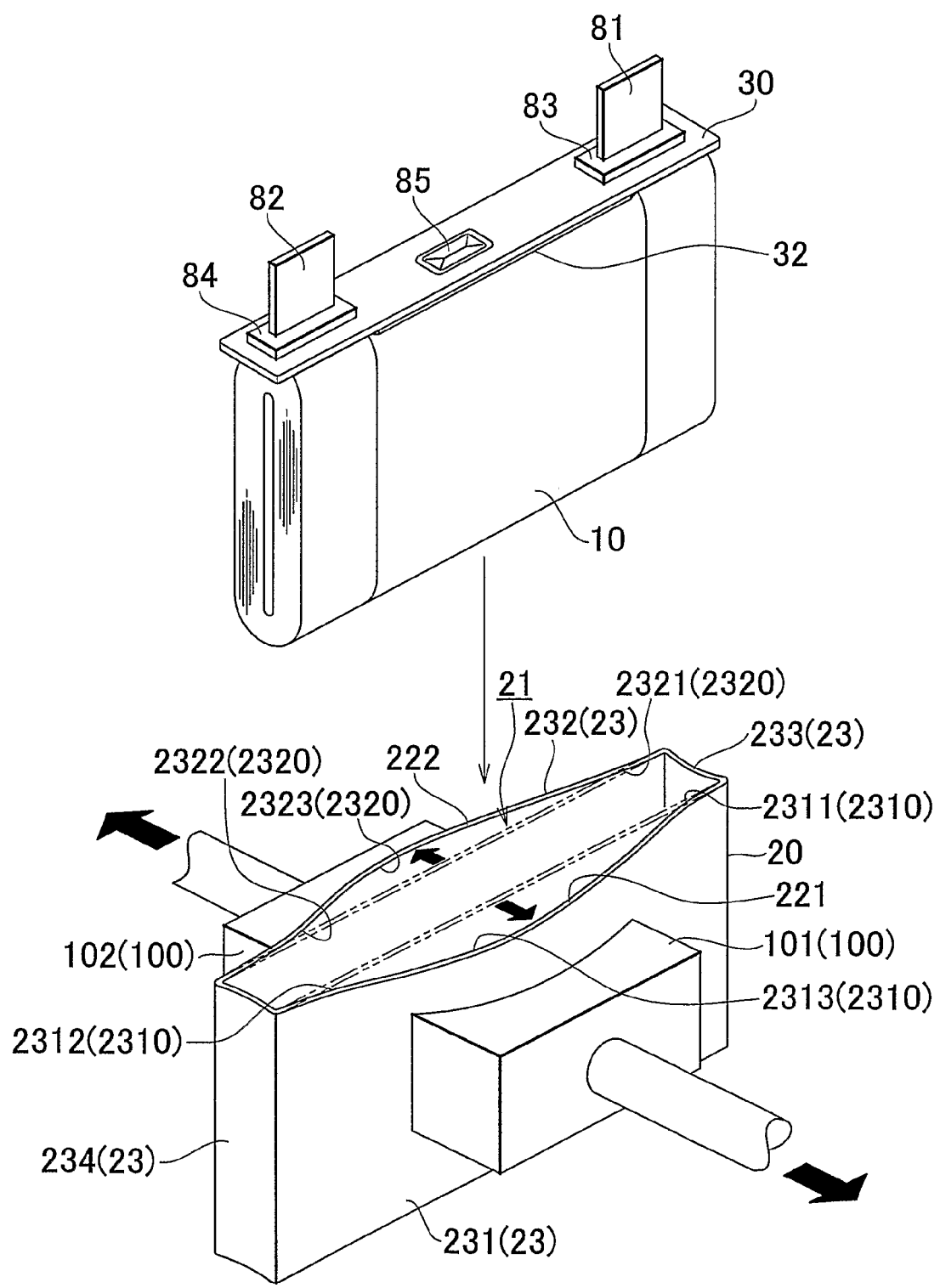
FIG. 9 is a view illustrating an opening closure member disposing step of a method for manufacturing a battery in accordance with the embodiment, showing the state before the case inside part of the opening closure member is positioned between first and second sides of the case member.

In the opening closure member disposing step, as shown in FIG. 9, the first and second sides 231 and 232 of the case member 20 are elastically deformed outwardly using a suction device 100 to be described below, in order to deform the first longest straight edge 221 and the second longest straight edge 222, respectively, into an outwardly convex shape. The suction device 100 is briefly described first, and the opening closure member disposing step using the suction device is described then.

As shown in FIG. 9, the suction device 100 includes a first suction part 101 and a second suction part 102 that are disposed to face each other and that are movable closer to and away from each other. When the case member 20 is disposed between the first suction part 101 and the second suction part 102, the first side 231 and the second side 232 of the case member 20 are sucked by the first suction part 101 and the second suction part 102 of the suction device 100, respectively, from an outer side of the case member 20. Then, the first and second suction parts 101 and 102 of the suction device 100 are moved apart from each other (in the directions of the arrows in FIG. 9) to elastically deform the first side 231 and the second side 232, respectively, in the opposite directions to each other (outwardly).

Now, the opening closure member disposing step is described with reference to FIGS. 9 to 11. In disposing the case inside part 32 of the opening closure member 30 internally of the sides 23 of the case member 20 in the opening closure member disposing step, the case inside part 32 is caused to contact the first center edge 2313 of the first edge 2310 of the first side 231. This prevents the first edge 2310 from being deformed toward the accommodation recess 21 (inwardly warped). On the other hand, the case inside part 32 is spaced from the first-first end 2311 of the first edge 2310, and from the first-second end 2312 of the first edge 2310. Likewise, the case inside part 32 is caused to contact the second center edge 2323 of the second edge 2320 of the second side 232 to prevent the second edge 2320 from being deformed toward the accommodation recess 21 (inwardly warped). On the other hand, the case inside part 32 is spaced from the second-first end 2321 of the second edge 2320, and from the second-second end 2322 of the second edge 2320.

A specific description follows. In disposing the case inside part 32 of the opening closure member 30 internally of the sides 23 of the case member 20 in the opening closure member disposing step, the suction device 100 discussed above is used. Specifically, as shown in FIG. 9, the case member 20 is disposed between the first suction part 101 and the second suction part 102 of the suction device 100, allowing the first suction part 101 and the second suction part 102 to suck the first side 231 and the second side 232 of the case member 20, respectively. Then, the first and second suction parts 101 and 102 are moved apart from each other, in other words, in the direction opposite to the accommodation recess 21. This causes the first side 231 and the second side 232 to be pulled and elastically deformed in the direction opposite to the accommodation recess 21 (outwardly warped), and causes the first longest straight edge 221 and the second longest straight edge 222, respectively, to be deformed into an outwardly convex shape. Then, with the first side 231 and the second side 232 elastically deformed as shown in FIGS. 10 and 11, the power generation element 10 and the case inside part 32 of the opening closure member 30 are inserted into the accommodation recess 21 of the case member 20 to dispose the case inside part 32 internally of the sides 23 of the case member 20.

Figure 11:
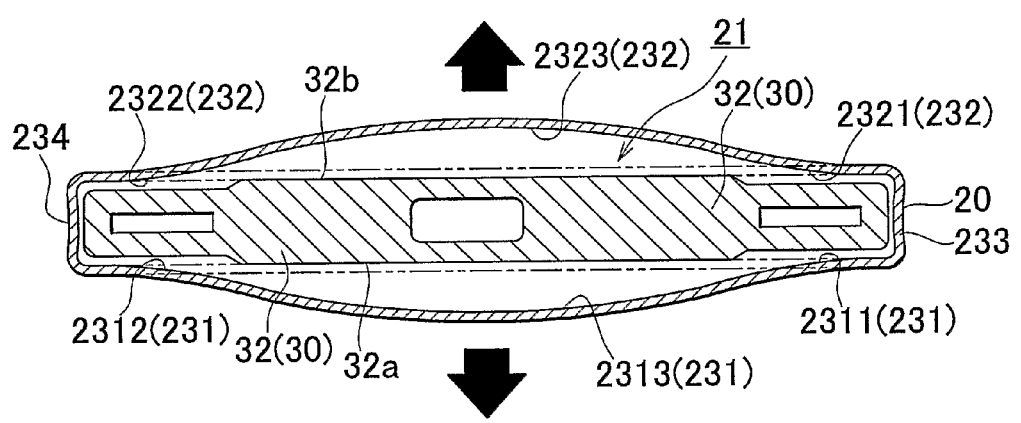
FIG. 11 is a cross sectional view taken along the line XI-XI in FIG. 10.

In this way, it is possible to prevent the case inside part 32 from rubbing against the first center edge 2313 of the first edge 2310 and the second center edge 2323 of the second edge 2320 while inserting the case inside part 32 internally of the sides 23 of the case member 20, and hence to prevent the generation of metal powder (see FIG. 11). On the other hand, the case inside part 32 is spaced from the first-first end 2311 and the first-second end 2312. The case inside part 32 is also spaced from the second-first end 2321 and the second-second end 2322. Accordingly, it is possible to prevent the case inside part 32 from rubbing against the first-first end 2311, the first-second end 2312, the second-first end 2321 and the second-second end 2322 while disposing the case inside part 32 internally of the sides 23 of the case member 20, and hence to prevent the generation of metal powder.

When the case inside part 32 is disposed internally of the sides 23 of the case member 20 as shown in FIG. 11, the first and second suction parts 101 and 102 of the suction device 100 are caused to release the first side 231 and the second side 232, respectively, canceling the deformation of the first side 231 and the second side 232 by their elasticity. Even if the case member 20 is inwardly warped, the first and second center edges 2313 and 2323 of the first and second sides 231 and 232, respectively, contact the case inside part 32 to cancel or correct the inward deformation or warping of the case member 20, since the wider portion 32W of the case inside part 32 is wide. Accordingly, even if the case member 20 with its first and second sides 231 and 232 inwardly warped in the free state is used, such inward warping can be corrected to allow appropriate welding, thereby preventing the sealing strength from being lowered by changes in welding position due to such inward warping.

Figure 12:
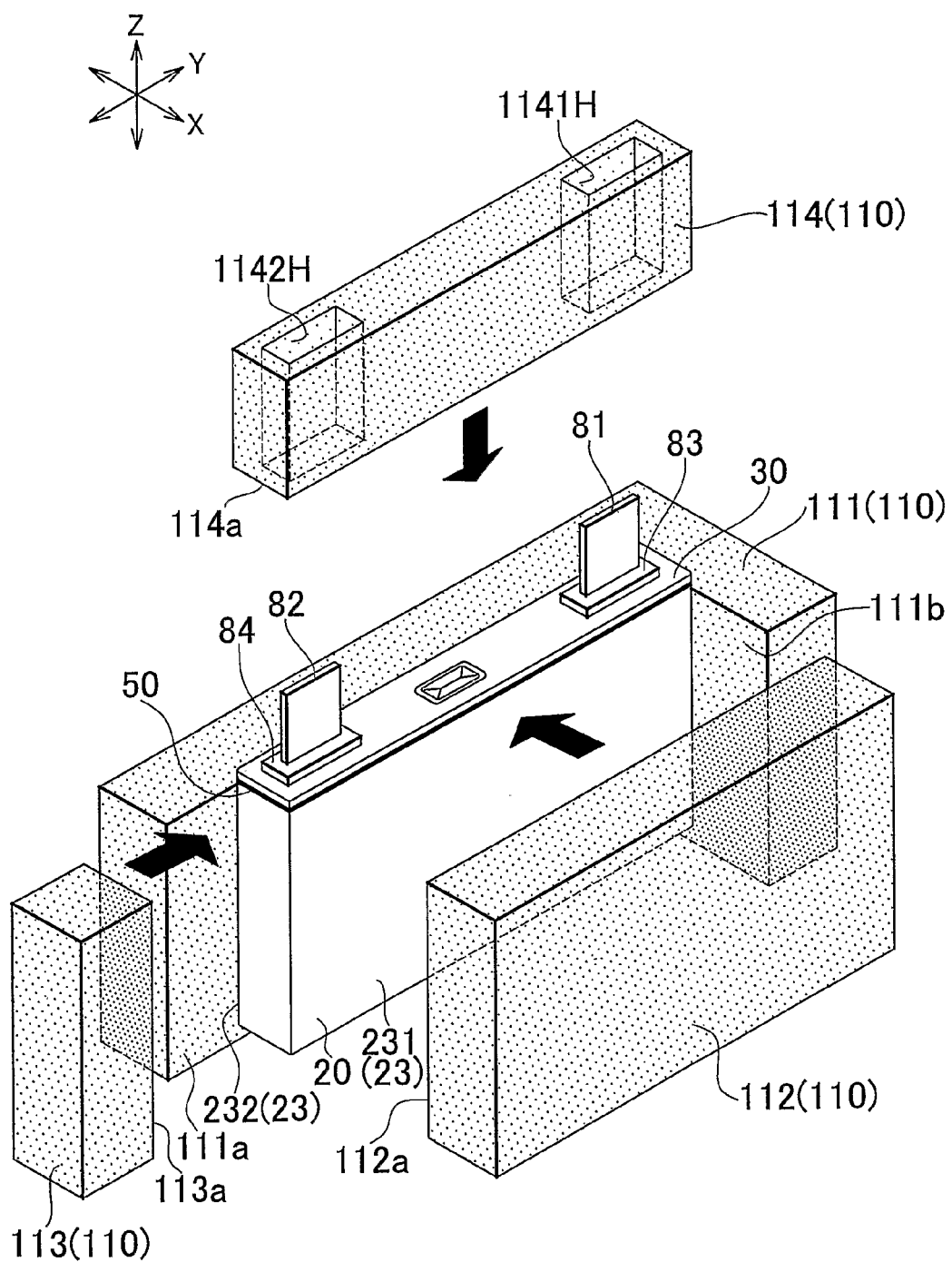
FIG. 12 is a view illustrating a welding step of the method for manufacturing a battery in accordance with the embodiment.

Now, the welding step is described. In the welding step, as shown in FIG. 12, a pressing device 110 to be described below is used to position the sides 23 of the case member 20 and the case contact part 31 of the opening closure member 30, and to press the first and second sides 231 and 232 of the case member 20 toward the accommodation recess 21. In the description of the pressing device 110, the upper left and lower right direction in FIG. 12 is defined as the X axis direction, the lower left and upper right direction is defined as the Y axis direction, and the vertical direction is defined as the Z axis direction.

As shown in FIG. 12, the pressing device 110 includes an L-shaped first pressing part 111 including a first-second pressing surface 111a and a first-third pressing surface 111b, a second pressing part 112 including a second pressing surface 112a, a third pressing part 113 including a third pressing surface 113a, and a fourth pressing part 114 including a fourth pressing surface 114a. The first pressing part 111 contacts the second side 232 of the case member 20 with its first-second pressing surface 111a, and the third side 233 of the case member 20 with its first-third pressing surface 113a. The second pressing part 112 is movable in the X axis direction to contact the first side 231 of the case member 20 with its second pressing surface 112a. The third pressing part 113 is movable in the Y axis direction to contact the fourth side 234 of the case member 20 with its third pressing surface 113a. The fourth pressing part 114 has a first through hole 1141H for accommodating the external positive terminal 81 and a portion of the positive terminal seal member 83 that is exposed to the outside, and a second through hole 1142H for accommodating the external negative terminal 82 and a portion of the negative terminal seal member 84 that is exposed to the outside. The fourth pressing part 114 is movable in the Z axis direction to contact an outer surface 30a of the opening closure member 30 with its fourth pressing surface 114a in order to press the opening closure member 30 toward the case member 20 with a predetermined pressing force. Consequently, the first pressing part 111 and the third pressing part 113 of the pressing device 110 press the third and fourth sides 233 and 234, respectively, toward each other. Also, the first pressing part 111 and the second pressing part 112 press the first side 231 and the second side 232, respectively, toward the accommodation recess 21.

In the welding step, as shown in FIGS. 7, 8 and 12, the case contact part 31 is caused to contact the opening edge 22 formed by the sides 23, the boundary (the opening edge 22) between the case contact part 31 and the sides 23 is irradiated with a laser beam from an outer side in the thickness direction of the sides 23 of the case member 20, and the laser beam is moved relative to the case member 20 and the opening closure member 30 around their periphery. In this way, the boundary between the case contact part 31 and the sides 23 is welded around their entire periphery. Consequently, the case member 20 and the opening closure member 30 are welded to each other at the welded part 50. The accommodation recess 21 of the case member 20 is thus closed by the opening closure member 30.

In the first edge welding step of the welding step, in which the first side 231 and the case contact part 31 are welded to each other, the first side 231 and the second side 232 are pressed toward the accommodation recess 21 by the first pressing part 111 and the second pressing part 112 of the pressing device 110, respectively. As a result, the wider portion 32W of the case inside part 32 is sandwiched between the first center edge 2313 and the second center edge 2323, and the first inside part side surface 32a of the case inside part 32 is brought into press contact with the first center edge 2313. In this state, the first edge 2310 of the first side 231 of the case member 20 and the case contact part 31 of the opening closure member 30 are welded to each other over the entire first edge 2310.

Likewise, in the second edge welding step, in which the second side 232 and the case contact part 31 are welded to each other, the second side 232 is pressed toward the accommodation recess 21. As a result, the second inside part side surface 32b of the case inside part 32 is brought into press contact with the second center edge 2323 of the second edge 2320. In this state, the second edge 2320 of the second side 232 of the case member 20 and the case contact part 31 of the opening closure member 30 are welded to each other over the entire second edge 2320.

The first side 231 and the second side 232 of the case member 20 are occasionally deformed or warped to swell outwardly in the free state. In the welding step as described above, however, even if the case member 20 with outward warping is used, such outward warping is corrected to reform the first and second sides 231 and 232 before welding, thereby preventing the sealing strength from being lowered by changes in welding position due to such outward warping.

In the first and second edge welding steps, it is possible to fix the positions of the first and second edges 2310 and 2320 by bringing the first and second center edges 2313 and 2323 into press contact with the case inside part 32. Thus, a temporarily fixing step to temporarily fix the opening closure member 30 to the case member 20 by spot welding or the like, which is normally performed prior to the welding step in which they are welded to each other around their entire periphery, can be omitted. That is, after the opening closure member disposing step, the sides 23 of the case member 20 and the case contact part 31 of the opening closure member 30 can be welded to each other around their entire periphery in the welding step without temporarily fixing the opening closure member 30 to the case member 20 in advance.

Then, a predetermined amount of electrolyte solution is poured into the accommodation recess 21 of the case member 20, and the safety valve 85 is secured to the valve hole 35H of the opening closure member 30. Consequently, the secondary battery 1 shown in FIGS. 1 and 2 is completed.

In the above embodiment, the first and second inside part side surfaces 32a and 32b of the wider portion 32W of the case inside part 32 of the opening closure member 30 are caused to contact the first and second center edges 2313 and 2323, respectively, over their entirety. However, the first and second center edges may be contacted only partly (at one or a plurality of points) as long as the first and second edges can be prevented from being deformed or warped toward the accommodation recess.

In the above embodiment, the sides 23 of the case member 20 generally have the shape of an elongated rectangular parallelepiped made up of the first side 231 and the second side 232, the third side 233 that is shorter than the first and second sides 231 and 232, and the fourth side 234 that is as long as and in parallel to the third side 233, the third and fourth sides 233 and 234 being disposed between the first and second sides 231 and 232 and including the straight edge 220 (see FIG. 4A). However, the shape of the sides of the case member is not limited to that in the above embodiment, and the first side and the second side may be connected by arcuate sides, for example. In the above embodiment, as shown in FIGS. 7 and 8, the first and second center welded parts 51 and 52 are deep enough to exceed the thickness of the first and second sides 231 and 232, respectively, and reach the case inside part 32. However, the first and second center welded parts may be not deep enough to exceed the thickness of the first and second sides and reach the case inside part as long as the first center welding depth of the first center welded part is greater than the first-first end welding depth of the first-first end welded part and the first-second end welding depth of the first-second end welded part, and as long as the second center welding depth of the second center welded part is greater than the second-first end welding depth of the second-first end welded part and the second-second end welding depth of the second-second end welded part.

In the first and second edge welding steps of the welding step of the above embodiment, the first and second sides 231 and 232 are pressed toward the accommodation recess 21 by the first and second pressing parts 111 and 112 of the pressing device 110, respectively. However, pressing means for pressing the first and second sides toward the accommodation recess in the first and second edge welding steps may be a jig such as a vise for clamping the first side and second side toward each other so that they will not move outwardly from each other.

In the above embodiment, the sides 23 of the case member 20 and the case contact part 31 of the opening closure member 30 are welded to each other by laser welding. However, the sides of the case member and the case contact part of the opening closure member may be welded to each other by electron beam welding, for example.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A battery comprising:
 a power generation element;
 a case member that accommodates the power generation element, the case member having a bottom, a side and an elongated opening edge; and
 an opening closure member that closes the case member, the opening closure member having a case contact part directly contacting the opening edge around an entire periphery thereof, and a case inside part projecting toward an inside of the case member from a portion of a surface of the opening closure member on the case member side internally of the case contact part, wherein the case inside part substantially surrounds an entire periphery of the opening closure member,
 wherein the case inside part has two narrower portions positioned at both ends of the case inside part in a longitudinal direction of the elongated opening edge of the case member and spaced from an inner surface of the side of the case member, and a wider portion positioned between the two narrower portions and directly contacting an inner surface of the side of the case member.

2. The battery according to claim 1, wherein:
 the case member accommodates the power generation element in an accommodation recess of the case member;
 the battery further comprises a welded part formed by welding the side of the case member and the case contact part of the opening closure member around an entire periphery of the side and the case contact part;
 the opening edge includes a first longest straight edge and a second longest straight edge that is as long as and in parallel to the first longest straight edge;
 the side includes a first side forming the first longest straight edge and a second side forming the second longest straight edge;
 the first side has a first edge along the first longest straight edge;
 the first edge has a first-first end and a first-second end positioned at both ends of the first edge in a direction along the first longest straight edge, and a first center edge positioned between the first-first end and the first-second end;
 the second side has a second edge along the second longest straight edge;
 the second edge has a second-first end and a second-second end positioned at both ends of the second edge in a direction along the second longest straight edge, and a second center edge positioned between the second-first end and the second-second end;
 the case inside part of the opening closure member contacts the first center edge to prevent warping deformation of the first edge toward the accommodation recess, and is spaced from the first-first end and the first-second end; and
 the case inside part of the opening closure member further contacts the second center edge to prevent warping deformation of the second edge toward the accommodation recess, and is spaced from the second-first end and the second-second end.

3. The battery according to claim 1, wherein the case inside part of the opening closure member has a first inside part side surface facing the first center edge and a second inside part side surface facing the second center edge, the entire first center edge contacts the first inside part side surface in the direction along the first longest straight edge, and the entire second center edge contacts the second inside part side surface in the direction along the second longest straight edge.

4. The battery according to claim 3, wherein
a welding depth of a first center welded part, which is the welded part where the first center edge is welded, in a thickness direction of the first side is greater than the welding depth of a first-first end welded part, which is the welded part where the first-first end is welded, and the welding depth of a first-second end welded part, which is the welded part where the first-second end is welded, and
a welding depth of a second center welded part, which is the welded part where the second center edge is welded, in a thickness direction of the second side is greater than the welding depth of a second-first end welded part, which is the welded part where the second-first end is welded, and the welding depth of a second-second end welded part, which is the welded part where the second-second end is welded.

5. The battery according to claim 1, wherein the elongated opening edge is generally rectangular in shape.

* * * * *